United States Patent [19]
D'Acierno et al.

[11] Patent Number: 5,876,679
[45] Date of Patent: Mar. 2, 1999

[54] FLUID BED REACTOR

[75] Inventors: John P. D'Acierno, Ridgefield; Stanley A. Bunk, Stamford, both of Conn.

[73] Assignee: Dorr-Oliver, Inc., Milford, Conn.

[21] Appl. No.: 833,658

[22] Filed: Apr. 8, 1997

[51] Int. Cl.[6] .................................................. F27B 15/08
[52] U.S. Cl. ......................... 422/143; 422/195; 422/228; 422/236
[58] Field of Search .................................. 422/143, 195, 422/228, 236

[56]  References Cited

U.S. PATENT DOCUMENTS

| | | | |
|---|---|---|---|
| 2,378,157 | 6/1945 | Ramseyer et al. ....................... | 422/143 |
| 2,678,874 | 5/1954 | Parker et al. ............................ | 422/143 |
| 2,702,742 | 2/1955 | Hillard, Jr. .............................. | 422/143 |
| 2,862,871 | 12/1958 | Smith ..................................... | 422/143 |
| 3,236,607 | 2/1966 | Porter, Jr. et al. . | |
| 3,672,069 | 6/1972 | Reh et al. . | |
| 3,985,547 | 10/1976 | Iacotti et al. . | |
| 4,021,184 | 5/1977 | Priestley . | |
| 4,082,545 | 4/1978 | Malgarini et al. . | |
| 4,202,774 | 5/1980 | Kos . | |
| 4,301,771 | 11/1981 | Jukkola et al. . | |
| 4,346,064 | 8/1982 | Leon . | |
| 4,517,162 | 5/1985 | Moss ...................................... | 422/142 |
| 4,681,685 | 7/1987 | Sutton et al. . | |
| 4,714,049 | 12/1987 | McCoy et al. . | |
| 4,879,958 | 11/1989 | Allen et al. ............................. | 110/245 |
| 4,925,632 | 5/1990 | Thacker et al. ......................... | 422/142 |
| 5,184,671 | 2/1993 | Alliston et al. . | |
| 5,338,517 | 8/1994 | Evans, III et al. ..................... | 422/191 |
| 5,406,718 | 4/1995 | Stein . | |

OTHER PUBLICATIONS

Dorr–Oliver, Inc., Dorr–Oliver Inc. Bulletin FS–4, 1991 "Fluosolids Systems".

*Primary Examiner*—Timothy McMahon
*Attorney, Agent, or Firm*—McCormick, Paulding & Huber

[57]  ABSTRACT

A fluid bed reactor is provided having a grid baffle structure to provide increased theoretical stages within the reactor to enable the reactor to be used for time/temperature dependent reactions requiring a number of mixing stages and/or an increased particle residence time. The preferred baffle structure comprises a plurality of staggered first and second vertical members extending partly across the reactor from opposed sides of the reactor which form a path for the feed to travel therethrough from the inlet to the outlet of the reactor with the vertical members having vertical cross-members, preferably shorter than the vertical members, extending completely between adjacent vertical members and/or partly in the space between the members to form reaction stage sections whereby feed entering the reactor moves in a serpentine path and/or a sequential underflow and/or overflow path through the reaction stage sections of the baffle from the inlet of the reactor to the reactor outlet.

15 Claims, 4 Drawing Sheets

FLUID BED REACTOR

BACKGROUND OF THE INVENTION

1. Field of the Invention

This invention relates generally to fluid bed reactors and, in particular, to fluid bed reactors having a grid baffle structure in the reactor which divides the reactor into reaction stage sections through which feed to the reactor flows sequentially through the reaction stage sections from the inlet of the reactor to the outlet of the reactor and which baffle structure increases the staging of the reactor and therefore provides a relatively uniform average particle retention time in the reactor. The reactor is especially suitable for performing time/temperature dependent chemical reactions such as the reduction/reaction of iron ore to iron carbide.

2. Description of Related Art

Fluid bed reactors are well known and have been applied to a number of industrial processes. The reactors may be used as chemical reactors for endothermic reactions such as the calcination of phosphate rock and the reduction of iron ore. Exothermic reactions such as roasting of zinc sulfide ores may also be performed in a fluid bed reactor. The reactors are also used as dryers for drying granular materials such as sand, plastics, detergents and the like. Combustion fluid bed systems have been used for the closely controlled disposal of toxic liquid and semi-solid wastes such as activated sludge, pulping waste and other organic wastes. The reactors are also used as boilers and steam generators and such reactors include fluid bed boilers, package and field erected boilers, superheaters and air heaters. The reactors can be used on a wide variety of feeds including coal, oil, gas and industrial and home refuse.

Fluid bed reactors typically comprise a vertical vessel having a lower horizontal plate, i.e., an air distributor or constriction plate, which supports a bed of particulate solids in a reaction chamber and separates the reaction chamber from a windbox or plenum below the plate. Combustion air is introduced into the windbox and passes upward through openings in the air distributor plate in sufficient volume to achieve a gas velocity that expands or fluidizes the solids, suspending the particulate solids of the bed in the flowing air stream forming a fluid bed and imparting to the individual solid particles a continuous random motion. Some important advantages of conducting a reaction or other heating or cooling process in a fluidized bed includes the substantially uniform bed temperature, combustion at relatively low temperatures and a high heat transfer rate.

The suspension of solids by an upward gas stream in the fluid bed reactor resembles a bubbling fluid, i.e., boiling water. The suspension is typically contained in the lower-middle portion of a vertical reactor termed a reaction chamber and is bound laterally by the reactor walls and below by a constriction plate beneath which is the windbox. The top of the bed looks like an irregular splashing, boiling surface and turbulence in the bed and intimate solid to gas contact provides a near ideal environment for carrying out chemical reactions, heating, cooling, combustion and other unit operation processes. The fluid bed for many operations is typically silica sand or other inert material and provides the area in the reactor in which most of the fluid bed process reactions occur. The bed may also be materials which are converted such an iron ore to iron carbide.

The intimate mixing in the bed provides high reaction kinetics and/or heating and/or combustion which increases process efficiency and enhanced energy utilization. The high turbulence and relatively long gas residence times of 5–8 seconds or more is satisfactory for most operations such as calcination, incineration and the like since for these reactions, the reaction kinetics are very rapid. The absence of interior moving parts in the reactor also provides minimal maintenance requirements. The bed provides a thermal fly wheel which minimizes temperature fluctuations due to variations in the feed and permits intermittent or batch operation with little or no auxiliary feed and avoids thermal shock to the refractory system. Capital and operating and maintenance costs are substantially less than for comparable rotating furnaces or multiple hearth furnaces. Staffing is usually one operator per shift or less.

As with all systems utilizing turbulent flow there is a natural back mixing in fluid bed reactors which enhances thermal efficiency. For many reactions the kinetics are very rapid and there are no negative aspects of back mixing. For time/temperature dependent reactions however, high conversion or completion of reaction are not feasible in the conventional fluid bed reactor which is considered a single stage reactor. Backmixing provides a non-uniform bed solids residence time profile. Particles which have short residence times are incompletely reacted. Excessive residence time has no beneficial effects. To increase the staging, multiple fluid bed reactors with series solids flow (gas flow either countercurrent in series or parallel) or parallel baffles in the reactor (sometimes radial baffles), have been used to generate a more uniform solids residence time profile closer to plug flow rather than turbulent flow. When residence time in the reactor is a factor in the process being performed and/or a great number of stages of operation are required, classical methods of staging using multiple reactors and/or increasing the staging in a single conventional fluid bed reactor, are technically not viable and/or are economically unattractive.

Time/temperature dependent reactions as noted above, are not feasible in a single stage fluid bed reactor and a number of processes and specially designed fluid bed reactors have been used in the past. A particularly important time/temperature dependent reaction is the reduction and reaction of iron ore (such as iron oxide) to produce iron carbide which may then be more easily used to produce iron or steel and the following description will be directed to this reaction although it will be appreciated that the invention is useful for other such time/temperature dependent reactions needing multiple staging.

U.S. Pat. No. 4,082,545 shows the direct reduction of iron ore in a system of multiple fluidized bed reactors to which the iron ore is successfully fed in series with the result that in each reactor, the iron ore is progressively reduced until a desired reduction of about 95% is achieved in the final reactor. The reducing gas is introduced into the bottom of each of the fluidized bed reactors and flows countercurrent to the direction of iron ore flowing through the reactors.

In U.S. Pat. No. 3,985,547 iron ore is reduced in a single fluid bed reactor wherein multiple vertical superposed bed levels are provided in the reactor tower and the ore passed by gravity downwardly from bed level to bed level. The lowermost and all superposed beds are fluidized by off gasses from which carbon dioxide and water have been stripped and by combusting methane with a substoichiometric quantity of oxygen and introducing the combustion products into an intermediate level of the column. U.S. Pat. No. 3,236,607 relates to a process for reducing iron ore to metallic iron in multiple stages in a single fluid bed reactor wherein the reactor is separated into two or more stages or chambers by placing one or more vertical transverse baffles extending across the diameter of the reactor and providing means for the transfer of solids from one side of the baffles to the other side by gravity with minimal back mixing of the solids.

U.S. Pat. No. 3,672,069 shows a fluidized bed cooler in which a plurality of parallel compartments are arranged side by side and are separated by respective baffles forming a weir or overflow arrangement whereby particles move from one compartment to another by gravity overflow and each compartment is fluidized by the introduction of a carrier or fluidizing gasses from below.

U.S. Pat. No. 5,406,718 shows an apparatus for drying particulate materials such as seeds and grains in which an air drier having superposed vertically spaced drying stages having mesh openings at least equal or larger than the suspension speed of the particles to be dried so that the seeds are temporarily suspended by the drying air flow until enough are accumulated to provide sufficient weight or downward pressure for the particles to overcome the upward air flow and pass downward through one or more mesh screens and reach the bottom of the dryer.

U.S. Pat. No. 5,184,671 shows a fluidized bed heat exchanger having a plurality of chambers formed in the housing wherein the chambers communicate to permit the material to flow from the feed inlet to at least one chamber and eventually out of one of the chambers and from the exchanger.

U.S. Pat. No. 4,021,184 is of interest to show a fluidized bed waste incinerator which uses cyclones to return particulate solids to the reactor which solids have been carried out of the reactor with the exhaust gases.

Bearing in mind the problems and deficiencies of the prior art, it is therefore an object of the present invention to provide a fluid bed reactor having a number of theoretical stages in a single reactor for efficiently and effectively performing time/temperature dependent reactions and other processes requiring an increased number of reaction or conversion stages in the reactor.

It is a further object of the invention to provide a method for performing time/temperature dependent reactions in a single fluid bed reactor.

Other objects and advantages of the present invention will be readily apparent from the following description.

SUMMARY OF THE INVENTION

The above and other objects and advantages, which will be apparent to those skilled in the art, are achieved in the present invention which is directed to, in a first aspect, a fluid bed reactor apparatus, which is preferably a pressure reactor, comprising:

a housing;

a reaction chamber within the housing;

a windbox region below said reaction chamber and a gas distributor plate therebetween;

a flue gas outlet;

inlet means for introducing feed and/or fuel and/or gas to the apparatus;

outlet means for removing materials from the apparatus; and a baffle structure in said reaction chamber comprising a plurality of reaction stage sections whereby feed entering the reactor moves in a substantially sequential path through the reaction stage sections of the baffle from the inlet of the reactor to the outlet of the reactor which baffle is in the form of a grid forming the reaction stage sections and preferably comprises a series of staggered preferably parallel baffles extending partly across the reactor from opposed sides of the reactor the parallel baffles having vertical cross-members extending completely between adjacent parallel baffles which cross-members are shorter than the parallel baffles and/or having openings therein to allow feed to travel from one reaction stage section by overflowing and/or underflowing the cross-members to the next reaction stage section. In another aspect, the cross-members may also extend partly in the space between adjacent parallel baffles to allow the feed to travel around the periphery of the cross-members from one reaction stage section to the next reaction stage section. The sequentially processed feed is then removed at the outlet of the reactor. Combinations of the above cross-members may be used for different feed flow patterns in the reactor such as underflow and/or overflow and flow around the periphery of the cross-members.

The baffle structure preferably comprises at least one first vertical member extending from one wall partly across the housing and at least one second vertical member extending from an opposed wall partly across the housing the first and second vertical members being staggered when there are more than one such first and/or second vertical members, at least one third vertical cross-member extending from a wall of the first member or second member completely or partly across the space between the first and second member and preferably at least one fourth vertical cross-member extending from a wall of the second member or first member completely or partly across the space between the first and second vertical members with the space formed between each vertical member and between each of the cross-members comprising a reaction stage section. In a highly preferred embodiment third and fourth vertical cross-members are shorter than the first and second vertical members to allow overflow and/or underflow of the feed from reaction stage section to reaction stage section. Holes or other openings can be employed in the third and fourth vertical cross-members either separately or in combination with a shorter length for this purpose or for through flow purposes from reaction stage sections to reaction stage section for some designs.

In a further aspect of the invention, the lower surface of the baffle structure is preferably positioned slightly above the surface of the gas distributor plate and the upper surface of the baffle structure extends substantially to the top of the housing. The feed is also preferably introduced at a point intermediate the height of the baffle structure into preferably the area formed between the housing and a vertical member. The height of the fluidized bed is generally contained within the baffle structure and can be controlled as discussed hereinbelow.

In another aspect of the invention, a method is provided for performing time/temperature dependent chemical reactions and other multiple stage processes in a single fluid bed reactor, preferably a pressure reactor, comprising the steps of:

providing a fluid bed reactor comprising:
a housing;
a reaction chamber within the housing;
a windbox region below said reaction chamber and a gas distributor plate therebetween;
a flue gas outlet;
inlet means for introducing feed and/or fuel and/or gas to the apparatus;

outlet means for removing materials from the apparatus;

a baffle structure in said reaction chamber comprising a plurality of reaction stage sections whereby feed entering the reactor moves in a substantially sequential path through the reaction stage sections of the baffle from the inlet of the reactor to the outlet of the reactor which baffle is in the form of a grid forming the reaction stage sections and preferably comprises a series of staggered preferably parallel baffles extending partly across the reactor from opposed sides of the reactor the parallel baffles having vertical cross-members extending completely between adjacent parallel baffles which cross-members are shorter than the parallel baffles and/or having openings therein to allow feed to travel from one reaction stage section by overflowing and/or underflowing the cross-members or flowing through the cross-members to the next reaction stage section and/or the cross-members extend partly in the space between adjacent parallel baffles to allow the feed to travel around the periphery of the cross-members from one reaction section to the next reaction stage section with the sequentially processed feed then removed at the outlet of the reactor;

feeding gas feed and fuel, if necessary, into the fluid bed apparatus;

reacting the mixture to form the desired product; and removing the product from the reactor through the outlet means.

In an additional aspect of the invention, a method is provided for reducing iron ore, including iron oxide, to iron carbide in the apparatus of the invention by using reducing gases such as CO and $H_2$ and mixtures thereof.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
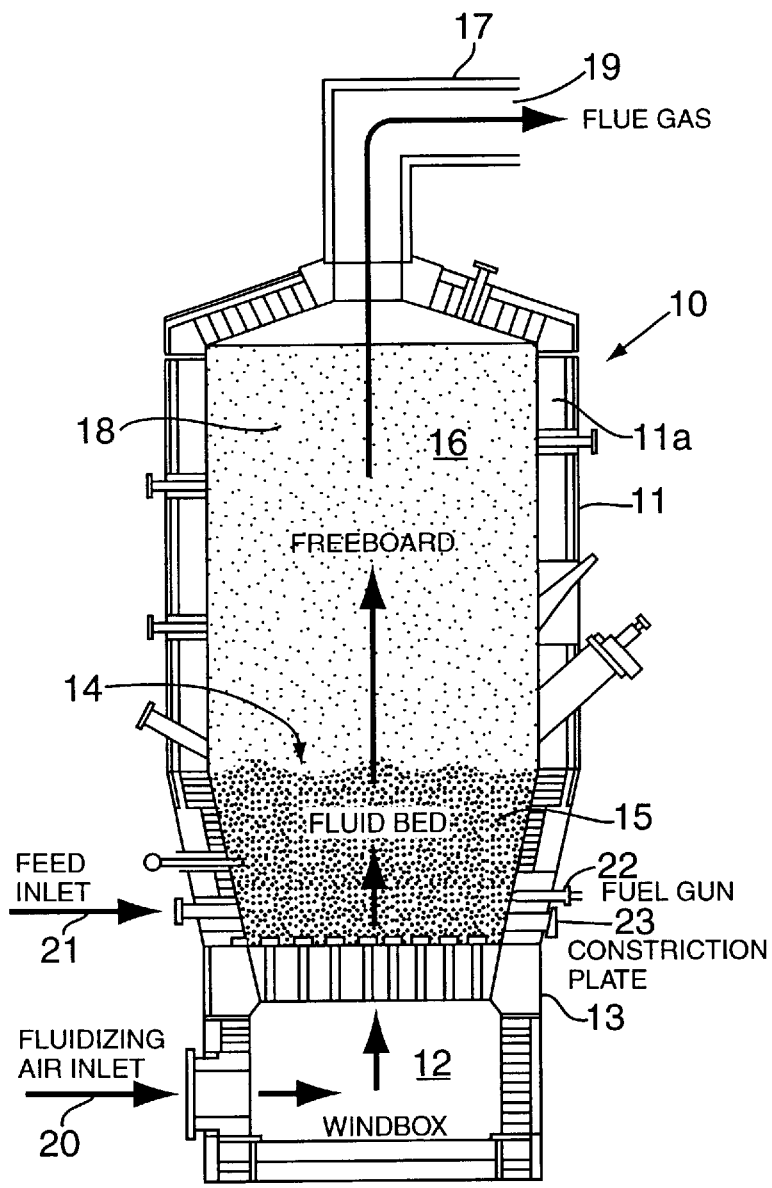
FIG. 1 is a schematic diagram of a conventional fluid bed reactor.

In describing the preferred embodiment of the present invention, reference will be made herein to FIGS. 1–6 of the drawings in which like numerals refer to like features of the invention. Features of the invention are not necessarily shown to scale in the drawings.

Referring to FIG. 1, a conventional fluid bed reactor of the prior art is shown generally in schematic form as 10. The reactor is generally cylindrical and has a reactor wall 11 which is typically steel or other alloy depending on the conditions the reactor will be subjected to. The reactor is usually lined with a refractory 11a to protect against the heat generated in the fluid bed reactor. The reactor has a windbox 12 at its lower end and a substantially horizontal gas distributor or constriction plate 13 extending across the diameter of the reactor which separates the windbox 12 from a reaction chamber 14. The reaction chamber is where the bulk of the reaction is carried out and a typical reactor (fluid) bed is shown as 15. In the reactor bed particulate matter together with gas and sometimes fuel, is mixed to form a turbulent mixture which resembles a bubbling boiling liquid.

Above the reactor bed 15 is a freeboard region 16 in which gas and entrained particulate matter 18 travel upward through the reactor and the heavier particles tend to settle due to gravity and fall back into the fluid bed 15. Gases and remaining entrained particulate matter enter flue 17 and exit as a flue gas 19.

Gas or air is supplied to a reactor through gas inlet 20 and the air flows upward through the openings in the gas distributor plate 13 and mixes with the solids and forms reactor (fluid) bed 15. Feed may be introduced to the reactor through conduit 21 and fuel, if necessary, through conduit 22. Product may be removed from the reactor through outlet 23.

As can be seen from FIG. 1, both the fluid bed 15 and freeboard region 16 of the reactor contain solid particles mixed with gas with the major concentration of solid particles being in the reaction chamber 14 forming fluid bed 15. The mixture is turbulent and as noted above resembles a boiling liquid.

Figure 2:
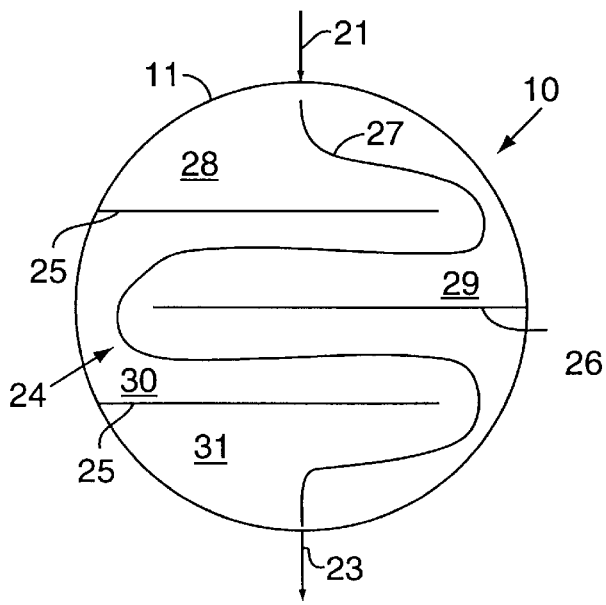
FIG. 2 is a top schematic view of a prior art reactor having a parallel baffle structure.

FIG. 2 shows a top schematic view of a conventional parallel grid baffle shown generally as 24 positioned in a fluid bed reactor 10. The baffle structure 24 comprises two first vertical members 25 and a staggered second member 26 which members extend from opposed walls of the reactor partly across the width or diameter of the reactor 10 and which are substantially parallel. Feed is shown entering through line 21 and product being removed on the opposite side of the reactor at outlet 23. The two first members 25 and one second member 26 divide the reactor into four reactor stage sections shown as 28, 29, 30 and 31. Additional reactor stage sections would be created if additional first members 25 and second members 26 were employed. Line 27 shows the passage or travel of feed (and eventually product as it is converted during its travel through the reactor) through the baffle structure reactor stage sections 28, 29, 30 and 31. In operation, the particulate feed matter travels through the reactor due to a hydraulic head which is greatest at feed entrance 21 and reactor section 28 and lowest at the product outlet 23 and reactor section 31. This is the type flow through the reactor which would normally result if a uniform gas distribution was passed through the baffle from the gas distributor plate. For situations where it may be desired to have different gas flow rates in different reactor sections of the baffle structure the gas distribution plate can be designed accordingly and/or the gas flow through the plate controlled at different pressures at different points of the plate. Each reactor stage section can be theoretically considered and defined as a reaction stage wherein complete or substantially complete reaction occurs at that concentration and temperature and pressure of the reactants. The vertical members 25 and 26 typically rest on the surface of the gas distributor plate.

Figure 3:
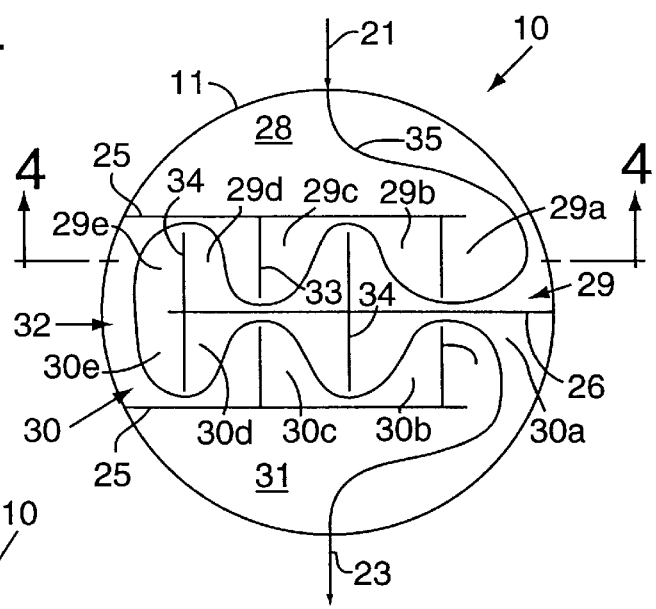
FIG. 3 is a top schematic view of a baffle structure of the invention positioned in a fluid bed reactor.

FIG. 3 shows a top schematic view of a baffle structure 32 of the invention positioned in a fluid bed reactor 10. The baffle structure shown generally as 32 comprises two vertical first members 25 and one vertical second member 26 which members are staggered and extend from opposed walls of the reactor partly across the width or diameter of the reactor 10 and which are substantially parallel. The baffle structure 32 of the invention also comprises third vertical cross-baffle members 33 extending from first members 25 partly across the space between first member 25 and second member 26. Likewise, fourth vertical cross-baffle members 34 extending from second member 26 also extend partly between the space between first member 25 and second member 26. It is preferred that the third and fourth baffle cross-members be substantially transverse to the first and second members. It is highly preferred that third member 33 and fourth cross-member 34 be staggered to produce the serpentine flow pattern of feed through the reactor as shown by numeral 35. Thus, feed entering through line 21 into reactor stage section 28 travels a circuitous route sequentially through reactor stage sections 29a, 29b, 29c, 29d, 29e, 30e, 30d, 30c, 30b and 30a. The reactant product is removed from reactor stage section 31 through line 23. The baffle structure of FIG. 3 shows 12 reactor stage sections. It is preferred that the base of the first members 25 and second vertical member 26 be positioned slightly above the top of the gas distributor plate. Cross-members 33 and 34 are preferably shorter than first members 25 and second member 26 and positioned so that there is a gap between the base of the first and second members and the base of the cross-members. This provides an additional opening through which the feed can flow sequentially from reaction stage section to reaction stage section as it flows through the baffle structure. This is generally termed "underflow".

Feed (and/or product) travel through the reactor is typically by a hydraulic head where the head is greatest at the feed inlet 21 and lowest at the product outlet 23. The head will gradually decrease during the feed travel through the reactor. It may be desirable for certain applications to have a gas flow which is different in the different reactor sections of the reactor to form a particular travel of the feed and/or product through the reactor and/or for enhanced reaction effects. The flow of feed and/or product through the reactor may also be over the top of the cross-members of the baffle structure (termed "overflow"). The top of the cross-members will typically be positioned below the top of the vertical members in this type process. For some reactors, openings in the cross-members can be used to provide through flow from reaction stage section to reaction stage section.

Figure 4:
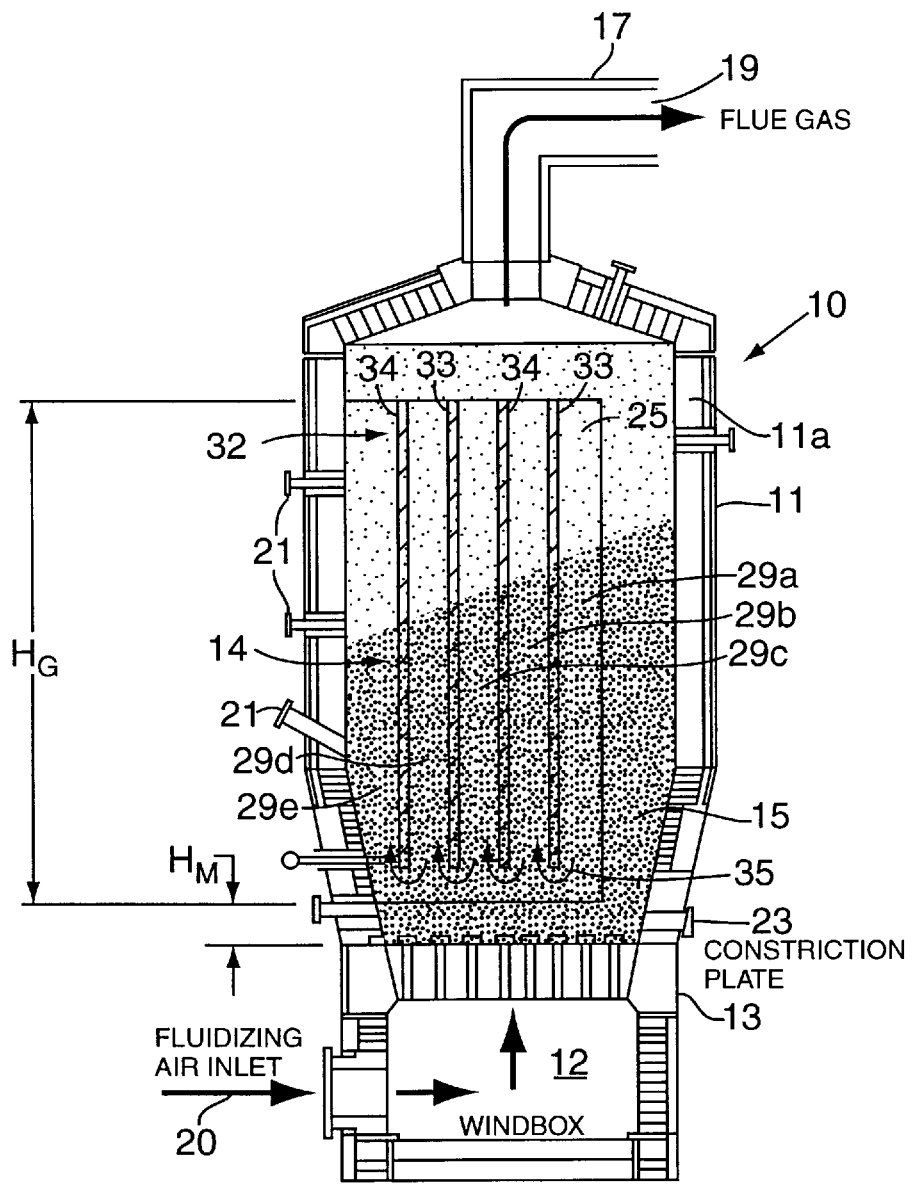
FIG. 4 is a cross-sectional view of the baffle of the present invention taken along the lines 4—4 of FIG. 3 which baffle is shown positioned in a fluid bed reactor.

Referring now to FIG. 4 which shows a schematic view of fluid bed reactor 10 used for the reduction of iron oxide to iron carbide. Positioned therein is baffle 32 of the invention shown in cross-section taken along lines 4—4 of the baffle of FIG. 3 of the invention. The fluid bed reactor has a reactor wall 11 and an inside refractory lining 11a to protect the reactor wall from the heat generated in the reactor. As with the conventional reactor as shown in FIG. 1, the reactor of the invention has a windbox region 12, a gas distributor plate 13, a reaction chamber 14 in which baffle 32 is positioned and a flue 17. The reactor does not have any significant freeboard region. The reactor is also preferably a pressure reactor.

Gas entering through line 20 into the windbox region 12 travels upward through the openings in the gas distributor plate 13 and mixes with particulate matter in the reactor chamber 14 to form a reactor bed 15. The reactor bed extends substantially throughout the height of the baffle structure 32 with the particulate concentration being generally greater at the lower levels of the reaction chamber.

Positioned in the reaction chamber 14 of the fluid bed reactor 10 is a baffle 32 comprising a plurality of reaction sections 29a, 29b, 29c, 29d and 29e through which the feed travels as fluid bed 15 past vertical first member 25 and sequentially in a serpentine path around and under cross-members 33 and 34 by hydraulic head. Referring also to FIG. 3, the baffle 32 comprises two (2) parallel spaced staggered vertical first members 25 and one second member 26 (not shown in FIG. 4), and alternating (staggered) vertical third cross-members 33 and fourth cross-members 34. A number of reaction stage sections 29a, 29b, 29c, 29d and 29e are formed between the baffle members.

For underflow operation, it is preferred that the lower end of the first and second vertical members 25 and 26 of the baffle 32 be positioned above gas distributor plate 13 a height $H_M$ typically 8–12 inches and that the lower end of cross-members 33 and 34 be shorter than vertical members 25 and 26 and the lower end of the cross-members be positioned above the base of the vertical members to allow feed to flow under the cross-members from reaction stage section to reaction stage section by hydraulic head. This height between the base of the first and second vertical members and the base of the third and fourth cross-members will vary depending upon the reactor dimensions and the purpose for which the reactor will be used. Likewise, the height of the baffle grid $H_G$ may also vary widely and is typically 25 to 90% preferably 70 to 90% of the height of the reactor which height is measured from the upper surface of the constriction plate to the top of the reactor housing. The width of the distance between third and fourth cross-members and the distance between parallel first vertical members 25 and second vertical members 26 may vary widely and may be designed based on the reactor and desired reaction to be performed as will be appreciated by those skilled in the art.

In operation as shown in FIGS. 3 and 4, gas ($CH_4$ and $H_2$ mixture) is introduced into windbox 12 through line 20 and travels upward through the openings in gas distributor plate 13 and mixes with solid $Fe_2O_3$ feed introduced through line 21. The feed is preferably introduced at a point intermediate the height of the baffle structure 32. The reaction chamber mixture comprising the particulate matter and gas forms a fluid bed 15 which extends about 25 to 60% of height of $H_G$ of baffle structure 32 and travels along path 35 and exits at feed outlet 23. Fluidizing gas, reaction gases and any entrained solids travel eventually travel out flue 17 as exit gas 19.

Figure 5:
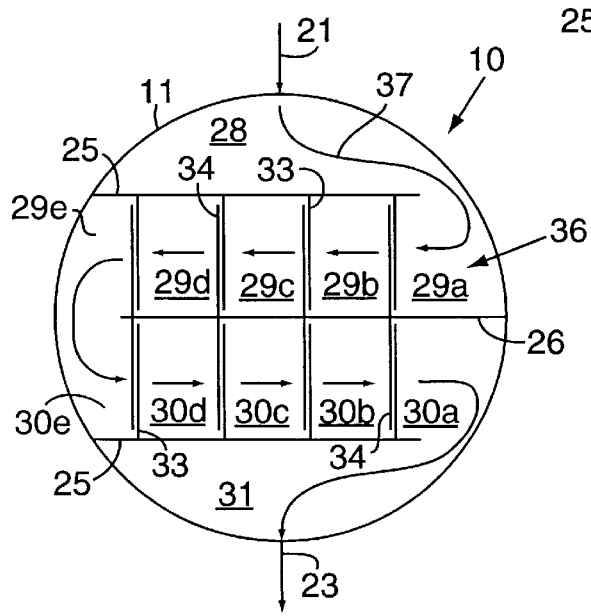
FIG. 5 is a top schematic view of another baffle structure of the invention positioned in a fluid bed reactor.

FIG. 5 shows another embodiment of the baffle of the invention shown generally as 36. In this baffle structure as compared with baffle structure 32 of FIG. 3, cross-members 33 and 34 extend almost completely across the space between vertical first and second members 25 and 26 and are positioned adjacent each other. This cross-member configuration is to allow for expansion of the cross-members and would have the same effect on feed flow through the baffle as single cross-members extending completely across the space. As can be seen from line 37, the feed flows into reactor 10 at 21 and through the reactor 10 sequentially through reaction stage sections 28, 29a, 29b, 29c, 29d, 29e, 30e, 30d, 30c, 30b, 30a and 31 and exits at outlet 23. The height of cross-members 33 and 34 are preferably shorter than first and second vertical members 25 and 26 and the flow would be either underflow or overflow or both depending on the positioning of the cross-members versus the vertical members. As noted above, through flow openings in the cross-members may also be employed alone or in conjunction with underflow and/or overflow operation.

Figure 6:
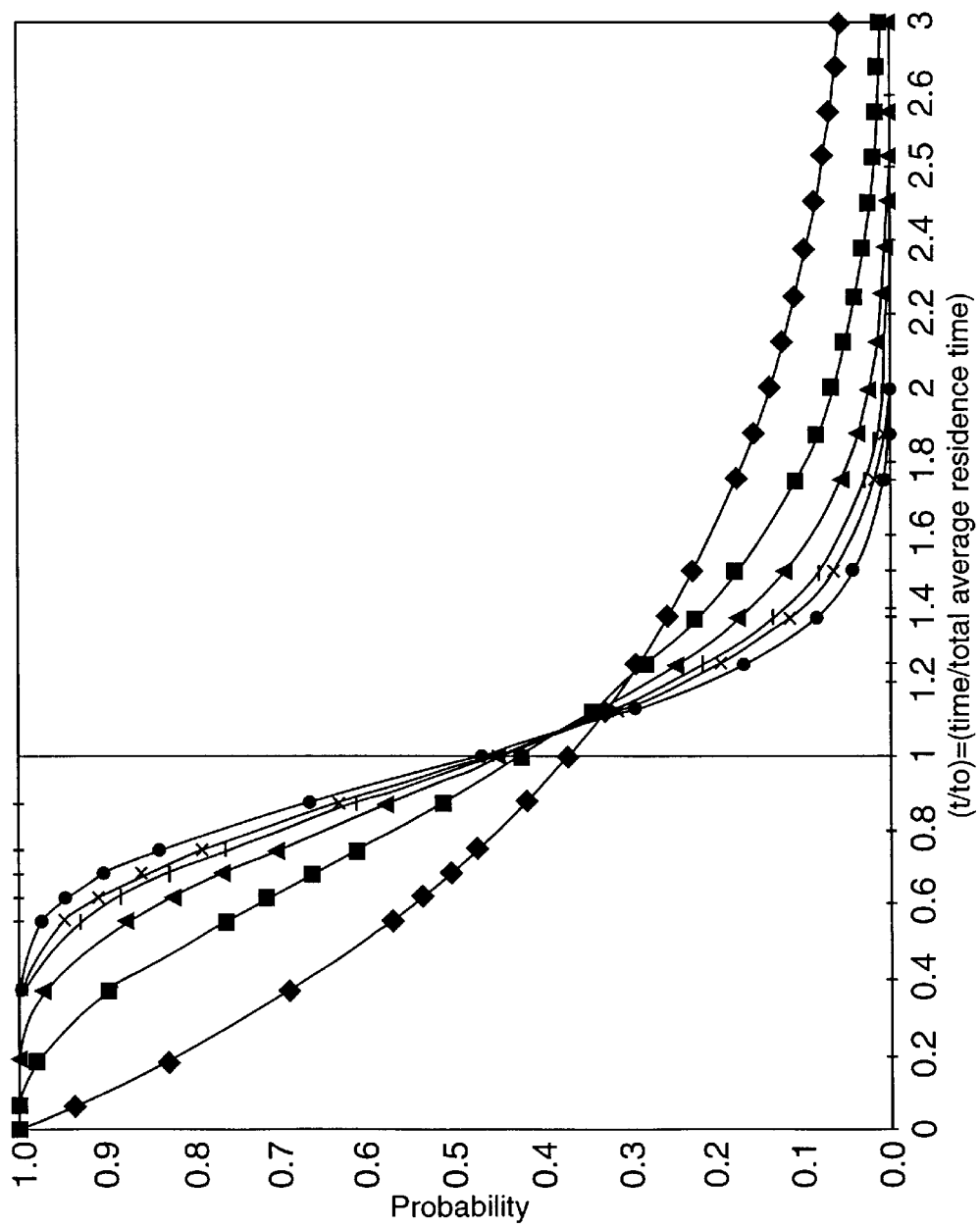
FIG. 6 is a graph showing the effects of staging in a fluid bed reactor of the inevention on the particle residence time in the reactor.

FIG. 6 shows the effect on staging on particle residence time with increased stages providing a more uniform residence time profile.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternative, modifications and variations as falling within the true scope and spirit of the present invention.

Thus, having described the invention, what is claimed is:

1. A fluid bed reactor apparatus comprising:
   a housing defining a reaction chamber;
   a windbox region located below the reaction chamber;
   a gas distributor plate positioned between the windbox region and the reaction chamber;
   inlet means for introducing feed and/or fuel and/or gas to the apparatus;
   outlet means for removing materials from the apparatus; and
   a baffle structure including at least one first vertical member coupled to the reactor and extending at least part-way across the reaction chamber;
   at least one second vertical member coupled to the reactor opposite to and offset from the first vertical member and extending at least part-way across the reaction chamber;
   a plurality of vertical cross-members each coupled to at least a respective one of the first and second vertical members and extending at least part-way between adjacent first and second vertical members; and wherein
   the baffle structure defines a plurality of reaction stage sections in the reaction chamber to cause the feed to follow a circuitous path between successive reaction stage sections.

2. The apparatus of claim 1 wherein the offset first and second vertical members are approximately parallel and the cross-members are substantially transverse to the first and second vertical members.

3. The apparatus of claim 2 wherein the vertical cross members extend partly in the space between the first and second vertical members.

4. The apparatus of claim 1 wherein the base of the baffle is above the surface of the gas distributor plate.

5. The apparatus of claim 4 wherein the height of the baffle is about 25–90% of the height of the reaction chamber.

6. The apparatus of claim 1 wherein the vertical cross-members extend completely between adjacent first and second vertical members and are shorter than the first and second vertical members and are positioned to allow overflow or underflow of the feed through the reaction stage sections.

7. A method is provided for performing chemical reactions and other heat related processes in a fluid bed reactor comprising the steps of:
   providing a fluid bed reactor having a housing defining a reaction chamber, a windbox region located below the reaction chamber, a gas distributor plate positioned between the windbox region and the reaction chamber, inlet means for introducing feed and/or fuel and/or gas to the apparatus, outlet means for removing materials from the apparatus; a baffle structure including at least one first vertical member coupled to the reactor and extending at least part-way across the reaction chamber, at least one second vertical member coupled to the reactor opposite to and offset from the first vertical member and extending at least part-way across the reaction chamber, a plurality of vertical cross-members each coupled to at least a respective one of the first and second vertical members and extending at least part-way between adjacent first and second vertical members; and wherein the baffle structure defines a plurality of reaction stage sections in the reaction chamber to cause the feed to follow a circuitous path between successive reaction stage sections;
   feeding a mixture of air, fuel, and reactants into the fluid bed apparatus;
   causing the chemical reaction to occur by heating the mixture in the reaction chamber while the air fuel and reactants sequentially move around the first and second vertical members and the cross-members between successive reaction stage sections; and
   removing the reacted mixture from the reaction chamber through the outlet means.

8. The method of claim 7 wherein the first and second vertical members are substantially parallel and the vertical cross-members are substantially transverse to the first and second members.

9. The method of claim 8 wherein the vertical cross-members extend partly in the space between the first and second vertical members.

10. The method of claim 7 wherein the base of the baffle is above the surface of the gas distributor plate.

11. The method of claim 10 wherein the height of the baffle is about 25–90% of the height of the reaction chamber.

12. The method of claim 7 wherein the vertical cross-members extend completely between adjacent first and second vertical members and are shorter then the first and second vertical members and are positioned to allow overflow or underflow of the feed through the reaction stage sections.

13. The method of claim 7 wherein iron oxide is converted to iron carbide.

14. The method of claim 9 wherein iron oxide is converted to iron carbide.

15. The method of claim 12 wherein iron oxide is converted to iron carbide.

* * * * *